US008497673B2

(12) United States Patent
Wang et al.

(10) Patent No.: US 8,497,673 B2
(45) Date of Patent: Jul. 30, 2013

(54) DIRECTIONAL RESISTIVITY ANTENNA SHIELD

(75) Inventors: Tsili Wang, Katy, TX (US); Jun Zhang, Katy, TX (US); Jing Li, Sugar Land, TX (US); Stephen D Bonner, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 435 days.

(21) Appl. No.: 12/567,961

(22) Filed: Sep. 28, 2009

(65) Prior Publication Data

US 2011/0074427 A1    Mar. 31, 2011

(51) Int. Cl.
G01P 3/48    (2006.01)
G01P 3/54    (2006.01)

(52) U.S. Cl.
USPC ........... 324/166; 324/339; 324/342; 324/338; 343/756; 343/719; 343/861

(58) Field of Classification Search
USPC .......................................... 324/166; 343/841
See application file for complete search history.

(56) References Cited

U.S. PATENT DOCUMENTS

| 2,047,159 A * | 7/1936 | Wood et al. ................... 174/396 |
| 2,064,831 A | 12/1936 | Hawksley |
| 2,288,735 A | 7/1942 | O'Connell |
| 2,419,480 A | 4/1947 | Bryan et al. |
| 2,623,923 A | 12/1952 | Zimmerman |
| 3,094,658 A | 6/1963 | Bravenec et al. |
| 3,754,271 A * | 8/1973 | Epis .............................. 343/756 |
| 4,305,115 A | 12/1981 | Armitage |
| 4,392,083 A | 7/1983 | Costello |
| 4,536,714 A * | 8/1985 | Clark .............................. 324/338 |
| 4,701,712 A | 10/1987 | Seeley et al. |
| 5,138,263 A | 8/1992 | Towle |
| 5,212,495 A | 5/1993 | Winkel et al. |
| 5,530,358 A | 6/1996 | Wisler et al. |
| 5,563,512 A * | 10/1996 | Mumby ......................... 324/339 |
| 6,181,138 B1 | 1/2001 | Hagiwara et al. |
| 6,191,586 B1 * | 2/2001 | Bittar ............................ 324/339 |
| 6,297,639 B1 | 10/2001 | Clark et al. |
| 6,380,744 B1 | 4/2002 | Clark et al. |
| 6,476,609 B1 | 11/2002 | Bittar |
| 6,483,310 B1 | 11/2002 | Meador |
| 6,557,794 B2 * | 5/2003 | Rosthal et al. ............. 242/444.1 |

(Continued)

OTHER PUBLICATIONS

International Search Report for International Application No. PCT/US2010/050372 dated May 30, 2011.

(Continued)

Primary Examiner — Melissa Koval
Assistant Examiner — Benjamin M Baldridge
(74) Attorney, Agent, or Firm — Kenneth Liu (57) ABSTRACT

A logging while drilling tool includes a directional resistivity antenna and an antenna shield having. The shield has at least one slot having at least one electrically open end formed therein. The antenna shield may include a base portion and a plurality of spaced apart fingers extending away from the base portion such that the finger ends are electrically isolated from the tool body and from one another. The antenna shield may alternatively include a plurality of spaced apart plates that are electrically isolated from the tool body and from one another. These antenna shields have been found to provide suitable physical protection for sensitive antenna components while at the same time being substantially transparent to both z-mode and x-mode electromagnetic waves.

25 Claims, 8 Drawing Sheets

U.S. PATENT DOCUMENTS

| | | | |
|---|---|---|---|
| 6,563,314 B1 * | 5/2003 | Kleinberg | 324/303 |
| 6,566,881 B2 | 5/2003 | Omeragic et al. | |
| 6,630,830 B2 | 10/2003 | Omeragic et al. | |
| 6,667,620 B2 * | 12/2003 | Homan et al. | 324/339 |
| 6,838,876 B2 | 1/2005 | Kruspe et al. | |
| 6,911,824 B2 | 6/2005 | Bittar | |
| 6,969,994 B2 | 11/2005 | Minerbo et al. | |
| 7,019,528 B2 | 3/2006 | Bittar | |
| 7,057,392 B2 | 6/2006 | Wang et al. | |
| 7,138,803 B2 | 11/2006 | Bittar | |
| 7,202,670 B2 | 4/2007 | Omeragic et al. | |
| 7,212,132 B2 | 5/2007 | Gao et al. | |
| 7,265,552 B2 | 9/2007 | Bittar | |
| 7,382,135 B2 | 6/2008 | Li et al. | |
| 7,414,407 B2 | 8/2008 | Wang et al. | |
| 7,436,183 B2 | 10/2008 | Clark | |
| 7,468,708 B2 * | 12/2008 | Park et al. | 343/841 |
| 7,525,315 B2 | 4/2009 | Fredette et al. | |
| 2003/0184303 A1 * | 10/2003 | Homan et al. | 324/339 |
| 2005/0088180 A1 * | 4/2005 | Flanagan | 324/338 |
| 2005/0218898 A1 * | 10/2005 | Fredette et al. | 324/342 |
| 2007/0256832 A1 * | 11/2007 | Hagiwara et al. | 166/250.16 |
| 2008/0001831 A1 * | 1/2008 | Park et al. | 343/702 |
| 2008/0074336 A1 * | 3/2008 | Signorelli et al. | 343/719 |
| 2008/0111745 A1 | 5/2008 | Takada et al. | |
| 2008/0136419 A1 * | 6/2008 | Seydoux et al. | 324/333 |
| 2008/0143336 A1 * | 6/2008 | Legendre et al. | 324/339 |
| 2008/0204347 A1 * | 8/2008 | Alvey et al. | 343/841 |
| 2008/0296064 A1 * | 12/2008 | Al Hadhrami | 175/45 |
| 2009/0179648 A1 * | 7/2009 | Fredette et al. | 324/342 |
| 2009/0302851 A1 * | 12/2009 | Bittar et al. | 324/338 |
| 2010/0244842 A1 * | 9/2010 | Wang | 324/338 |

OTHER PUBLICATIONS

Written Opinion for International Application No. PCT/US2010/050372 dated May 30, 2011.

International Preliminary Report on Patentability for International Application No. PCT/US2010/050372 dated Apr. 12, 2012.

* cited by examiner

DIRECTIONAL RESISTIVITY ANTENNA SHIELD

RELATED APPLICATIONS

None.

FIELD OF THE INVENTION

The present invention relates generally to downhole measurement tools utilized for measuring electromagnetic properties of a subterranean borehole. More particularly, embodiments of this invention relate to an antenna shield configured for use with a directional resistivity antenna.

BACKGROUND OF THE INVENTION

The use of electrical measurements in prior art downhole applications, such as logging while drilling (LWD), measurement while drilling (MWD), and wireline logging applications is well known. Such techniques may be utilized to determine a subterranean formation resistivity, which, along with formation porosity measurements, is often used to indicate the presence of hydrocarbons in the formation. For example, it is known in the art that porous formations having a high electrical resistivity often contain hydrocarbons, such as crude oil, while porous formations having a low electrical resistivity are often water saturated. It will be appreciated that the terms resistivity and conductivity are often used interchangeably in the art. Those of ordinary skill in the art will readily recognize that these quantities are reciprocals and that one may be converted to the other via simple mathematical calculations. Mention of one or the other herein is for convenience of description, and is not intended in a limiting sense.

Directional resistivity measurements are also commonly utilized to provide information about remote geological features (e.g., remote beds, bed boundaries, and/or fluid contacts) not intercepted by the measurement tool. Such information includes, for example, the distance from and direction to the remote feature. In geosteering applications, directional resistivity measurements may be utilized in making steering decisions for subsequent drilling of the borehole. For example, an essentially horizontal section of a borehole may be routed through a thin oil bearing layer. Due to the dips and faults that may occur in the various layers that make up the strata, the distance between a bed boundary and the drill bit may be subject to change during drilling. Real-time distance and direction measurements may enable the operator to adjust the drilling course so as to maintain the bit at some predetermined distance from the boundary layer. Directional resistivity measurements also enable valuable geological information to be estimated, for example, including the dip and strike angles of the boundary as well as the vertical and horizontal conductivities of the formation.

Methods are known in the art for making LWD directional resistivity measurements. Directional resistivity measurements commonly involve transmitting and/or receiving transverse (x-mode or y-mode) or mixed mode (e.g., mixed x- and z-mode) electromagnetic waves. Various tool configurations are known in the art for making such measurements. For example, U.S. Pat. No. 6,181,138 to Hagiwara teaches a method that employs an axial (z-mode) transmitting antenna and three co-located, circumferentially offset tilted receiving antennae. U.S. Pat. Nos. 6,969,994 to Minerbo et al., 7,202,670 to Omeragic et al., and 7,382,135 to Li et al teach a method that employs an axial transmitting antenna and two axially spaced tilted receiving antennae. The receiving antennae are further circumferentially offset from one another by an angle of 180 degrees. U.S. Pat. Nos. 6,476,609, 6,911,824, 7,019,528, 7,138,803, and 7,265,552 to Bittar teach a method that employs an axial transmitting antenna and two axially spaced tilted receiving antennae in which the tilted antennae are tilted in the same direction. U.S. Pat. Nos. 7,057,392 and 7,414,407 to Wang et al teach a method that employs an axial transmitting antenna and two longitudinally spaced transverse receiving antennae.

One difficulty in making LWD resistivity measurements (both conventional and directional measurements) is constructing transmitting and receiving antennae that are capable of withstanding the demanding downhole conditions. As is known to those of ordinary skill in the art, LWD tools are routinely subject to severe mechanical impacts with the borehole wall and with cuttings in the borehole fluid. These impacts would quickly destroy the sensitive antenna components if they were left unprotected. Conventional LWD resistivity tools commonly employ shields to physically protect the antennae. Suitable antenna shields must provide sufficient mechanical protection without distorting and/or over-attenuating the transmitted and/or received electromagnetic waves. In practice virtually all antenna shields that provide suitable protection also attenuate or selectively attenuate the electromagnetic waves due to the physical barrier that they provide. There is a difficult practical tradeoff in configuring an antenna shield that provides sufficient mechanical protection and has a low, non-selective attenuation. In general, highly protective shields tend also to be highly attenuating.

Conventional LWD resistivity tools commonly employ shields having slots (or apertures) formed therein. For example, U.S. Pat. No. 5,530,358 to Wisler et al discloses an LWD tool having a plurality of circumferentially spaced, axial slots formed in the outer surface of the tool housing. The use of a protective sleeve having axial slots is also known. Such antenna shields are known to provide adequate mechanical protection with sufficiently low attenuation of axial (z-mode) electromagnetic waves. Axially slotted shields are therefore commonly used in non-directional (z-mode) resistivity tools.

While certain axially slotted shields are known to exhibit sufficiently low attenuation to axial electromagnetic waves, these shields are also known to highly attenuate and distort transverse (x- and y-mode) electromagnetic waves. As such, the conventional wisdom in the art is that axially slotted shields are unsuitable for use with directional resistivity antennae (antennae that are configured to transmit and/or receive transverse mode or mixed mode electromagnetic waves). Directional resistivity tools therefore commonly employ sloped, curved, and/or circumferential slots. For example, U.S. Pat. No. 6,297,639 to Clark et at discloses a directional resistivity tool having a plurality of sloped (non-axial) and/or curved slots formed in an outer surface of the tool body. U.S. Pat. No. 6,566,881 to Omeragie et al discloses a tool having a plurality of axially spaced, circumferential slots formed in the tool body. U.S. Pat. No. 7,057,392 to Wang et al discloses a directional resistivity tool having a plurality of transversal slots formed in an outer surface of the tool body to protect transversal antennas.

When there is a desire to substantially collocate a non-directional (axial) antenna with a directional antenna to perform a multi-component measurement, multidirectional slots are often employed. These slots can compromise the structural integrity of the tool. In addition, fabrication of drill collars having multiple sloped, curved, and/or circumferential slots typically requires complex and expensive machining operations. Therefore, there is a need in the art for an improved antenna shield to be used in a directional resistivity tool.

SUMMARY OF THE INVENTION

Aspects of the present invention are intended to address the above described need for improved directional resistivity tools. In one exemplary embodiment, the invention includes a logging while drilling tool having at least one directional resistivity antenna configured to transmit and/or receive electromagnetic waves having a transverse component. The invention further includes an antenna shield deployed about the directional resistivity antenna. The shield includes at least one (and preferably a plurality of) slots having at least one electrically open end formed in the shield. Certain shield embodiments include a plurality of protective fingers extending away from a base portion. The finger ends are electrically isolated from the tool body and from one another. In these embodiments, the slots between the corresponding finger ends include one electrically open end. Other embodiments include a plurality of spaced-apart plates that are electrically isolated from one another and from the tool body. The slots (or gaps) between these plates are electrically open on both ends.

Exemplary embodiments of the present invention may advantageously provide several technical advantages. For example, antenna shields in accordance with the present invention have been found to provide suitable physical protection for sensitive antenna components while at the same time having a low attenuation to both z-mode and x-mode (and/or y-mode) electromagnetic waves. As such, shields in accordance with the present invention may be advantageously used for collocated, multi-mode antennae. Being essentially transparent to both z-mode and x-mode, the shields tend to impart little distortion to the transmitted and/or received electromagnetic waves. Moreover, the inventive shield does not require the use of sloped, curved, and/or circumferential slots. Preferred embodiments of the invention make use of axial slots having at least one electrically open end and therefore tend to provide for relatively simple and inexpensive fabrication.

In one aspect the present invention includes a logging while drilling directional resistivity tool. A directional resistivity antenna is deployed on a logging while drilling tool body and configured to transmit and/or receive electromagnetic waves having a transverse component. A metallic shield is deployed on the tool body about the directional resistivity antenna. The shield includes a base portion and a plurality of spaced apart fingers, each of which includes a finger end that is electrically isolated from the tool body and from each of the other finger ends.

In another aspect, the present invention includes a logging while drilling directional resistivity tool. A directional resistivity antenna is deployed on a logging while drilling tool body. The directional resistivity antenna is configured to transmit and/or receive electromagnetic waves having a transverse component. A metallic shield is deployed on the tool body about the directional resistivity antenna and includes a plurality of spaced apart slots having at least one open end formed therein such that there is no electrically conductive loop about the slots.

In yet another aspect, the present invention includes a logging while drilling directional resistivity tool. First and second collocated resistivity antennae are deployed on a logging while drilling tool body. The first antenna is configured to transmit and/or receive axial electromagnetic waves and the second antenna is configured to transmit and/or receive an electromagnetic wave having a substantially pure transverse component. A metallic shield is deployed on the tool body about the directional resistivity antenna. The shield includes a base portion and a plurality of spaced apart fingers. Each of the fingers is parallel with a longitudinal axis of the tool body and further including a finger end that is electrically isolated from the tool body and from each of the other finger ends.

In still another aspect, the present invention includes a logging while drilling directional resistivity tool. First and second collocated resistivity antennae are deployed on a tool body having a longitudinal axis. The first antenna is configured to transmit and/or receive axial electromagnetic waves and the second antenna is configured to transmit and/or receive an electromagnetic wave having a substantially pure transverse component. A metallic antenna shield is deployed on the tool body about the directional resistivity antenna. The antenna shield includes a plurality of spaced apart plates, each of which is electrically isolated from the tool body and from each of the other plates.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Referring now to FIGS. 1 through 8, exemplary embodiments of the present invention are depicted. With respect to FIGS. 1 through 8, it will be understood that features or aspects of the embodiments illustrated may be shown from various views. Where such features or aspects are common to particular views, they are labeled using the same reference numeral. Thus, a feature or aspect labeled with a particular reference numeral on one view in FIGS. 1 through 8 may be described herein with respect to that reference numeral shown on other views.

Figure 1:
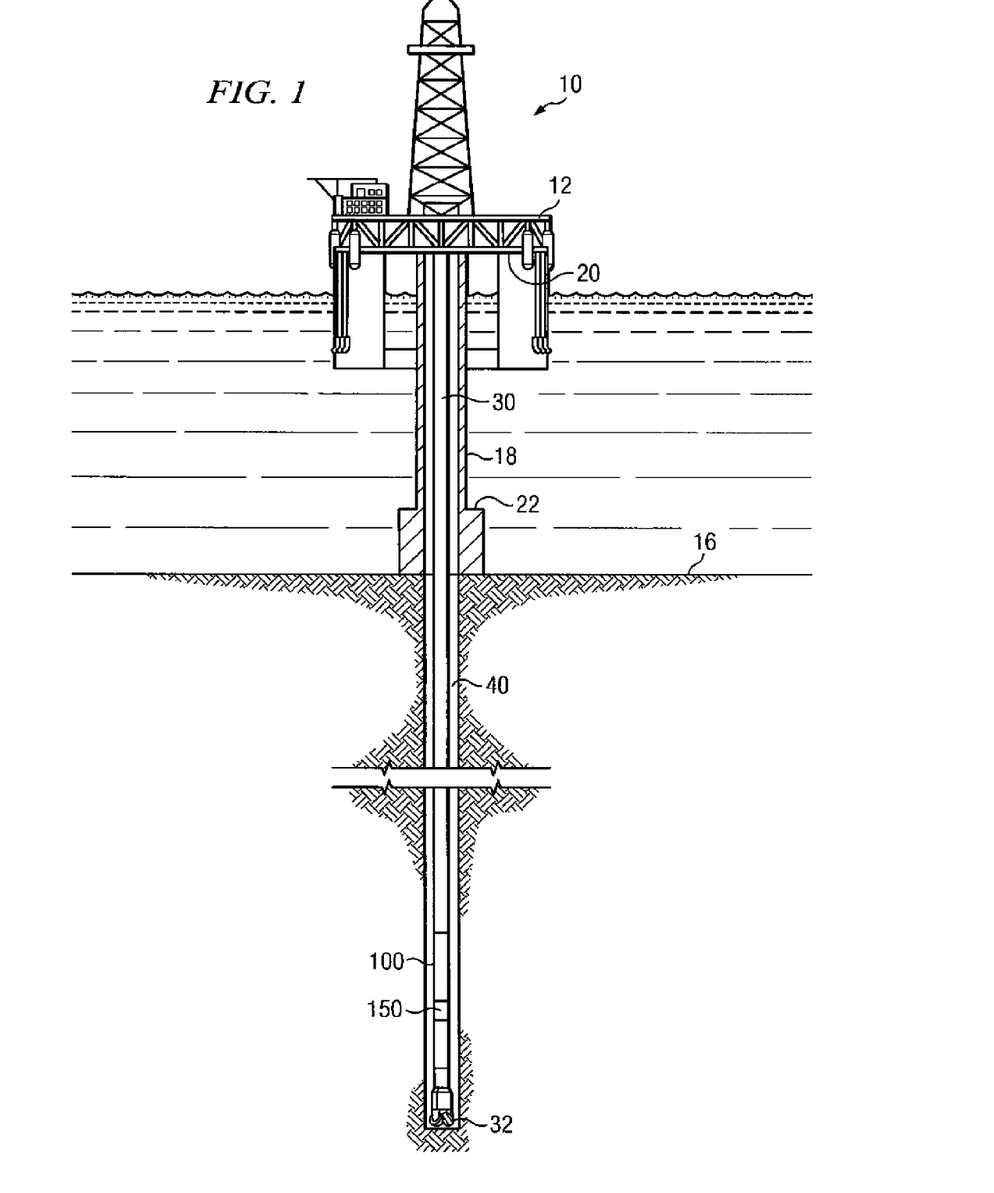
FIG. 1 depicts a conventional drilling rig on which exemplary embodiments of the present invention may be utilized.

FIG. 1 depicts one exemplary embodiment of a logging while drilling tool 100 in use in an offshore oil or gas drilling assembly, generally denoted 10. In FIG. 1, a semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering the drill string 30, which, as shown, extends into borehole 40 and includes a drill bit 32 and a directional resistivity tool 100. Embodiments of directional resistivity tool 100 include at least one directional resistivity antenna having an antenna shield 150. The antenna shield includes at least one slot having at least one electrically open end (the open ended slots are not depicted on FIG. 1). Drill string 30 may further optionally include a downhole drill motor, a mud pulse telemetry system, and one or more of numerous other sensors, such as a nuclear logging instrument, for sensing downhole characteristics of the borehole and the surrounding formation. The drill string may further optionally include an azimuth (tool face) sensor, e.g., including one or more accelerometers, magnetometers, and/or gyroscopes. The invention is not limited by such optional sensor deployments.

It will be understood by those of ordinary skill in the art that the deployment depicted on FIG. 1 is merely exemplary for purposes of describing the invention set forth herein. It will be further understood that the directional resistivity tool 100 of the present invention is not limited to use with a semisubmersible platform 12 as illustrated on FIG. 1. Resistivity tool 100 is equally well suited for use with any kind of subterranean drilling operation, either offshore or onshore. While resistivity tool 100 is shown coupled with drill string 30 on FIG. 1, it will also be understood that the invention is not limited to measurement while drilling (MWD) and/or logging while drilling (LWD) embodiments. Resistivity tools in accordance with the present invention may also be configured for use in wireline applications.

Figure 2:
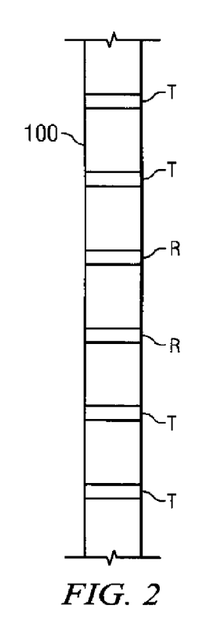
FIG. 2 depicts a portion of one exemplary embodiment of the measurement tool depicted on FIG. 1.

FIG. 2 depicts a portion of one exemplary embodiment of measurement tool 100. In the exemplary embodiment depicted measurement tool 100 includes a plurality of axially spaced transmitting antennae T and receiving antennae R deployed on a tool body. FIG. 2 depicts a well known arrangement in which first and second receivers R are deployed symmetrically between one or more sets of transmitters T. Those of ordinary skill in the art will appreciate that such an arrangement enables the acquisition of compensated resistivity measurements, however, it will be appreciated that the invention is not limited to any particular transmitter and/or receiver spacing nor to the use of compensated or uncompensated measurements. The transmitters and/or receivers may be spaced along the length of the tool body in substantially any suitable arrangement.

Exemplary embodiments in accordance with the present invention include at least one transmitting and/or receiving antennae configured for making directional resistivity measurements. As such the antenna may be configured to transmit and/or receive electromagnetic waves having a transverse component (i.e., either substantially pure transverse mode waves or mixed transverse and axial mode waves).

It will be appreciated that the invention may include substantially any directional resistivity antenna in which a portion of the antenna wire is oriented in a non-orthogonal directional with the longitudinal axis. The directional resistivity antenna may be configured to transmit and/or receive substantially pure x-mode (and/or y-mode) electromagnetic waves or mixed mode electromagnetic waves (e.g., mixed x-mode and z-mode or mixed x-mode and y-mode waves). The invention may include various known antenna configurations for transmitting and/or receiving such pure or mixed mode waves. For example, transverse antennae, saddle antennae, and non-planar antennae may be configured to transmit and/or receive substantially pure x-mode electromagnetic waves while conventional tilted antenna may be configured to transmit and/or receive mixed mode electromagnetic waves.

Figure 3A:
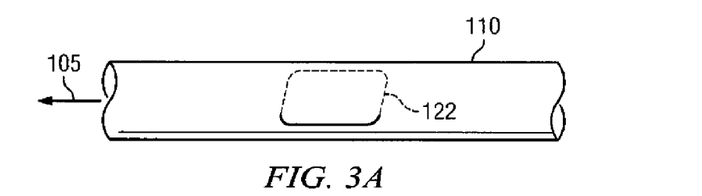
FIGS. 3A, 3B, 3C, 3D, and 3E (FIG. 3) depict exemplary directional antenna embodiments suitable for use in the present invention.
Figure 3B:
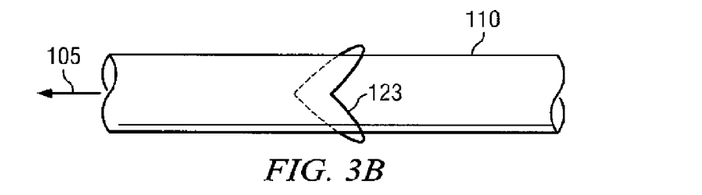
Figure 3C:
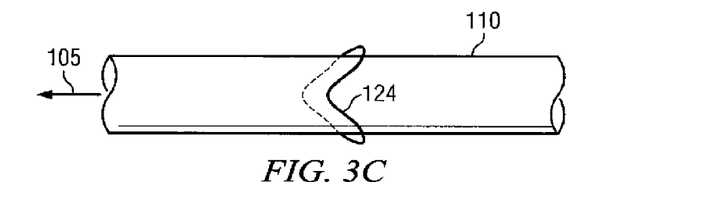
Figure 3D:
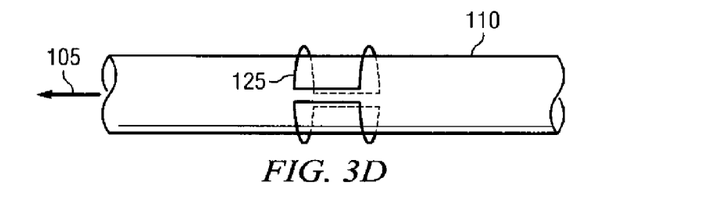
Figure 3E:
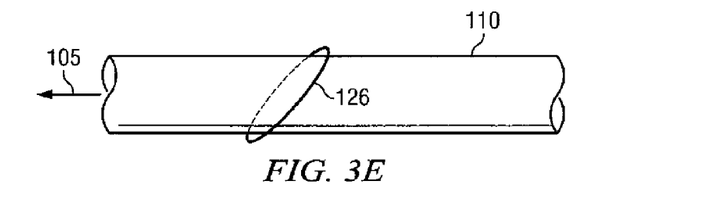

Exemplary directional antenna configurations suitable for use with the present invention are depicted on FIGS. 3A-3E (collectively FIG. 3). In each configuration, at least a portion of the antenna wire is non-orthogonal (and preferably parallel with) the longitudinal axis 105 of the tool body 110. FIG. 3A depicts a transverse antenna configuration in which a substantially planar loop of antenna wire 122 is deployed parallel with the longitudinal axis 105 (thereby having a dipole moment that is transverse to the axis 105). FIG. 3B depicts a bi-planar antenna configuration in which first and second semi-elliptical (or semi-oval) sections of antenna wire 123 reside on a corresponding distinct geometric planes. FIG. 3C depicts a serpentine configuration in which the antenna wire 124 loops about the tool body such that the axial separation between the non-planar loop of antenna wire 124 and a circular centerline of the antennae varies periodically (e.g., sinusoidally) with respect to the azimuth angle about the circumference of the tool. The antenna embodiments depicted on FIGS. 3B and 3C are disclosed in commonly assigned and U.S. patent application Ser. No. 12/410,153 (now U.S. Patent Publication 2010/0244841), which is hereby fully incorporated by reference. FIG. 3D depicts a saddle coil 125 configuration including circumferential and axial antenna portions. This saddle coil configuration is described in more detail below with respect to FIG. 4B. The configurations depicted on FIGS. 3A through 3D are typically configured for transmitting and/or receiving substantially pure transverse (x-mode) electromagnetic waves. FIG. 3E depicts a conventional tilted antenna 126 configuration suitable for transmitting and/or receiving mixed mode (e.g., mixed x- and z-mode) electromagnetic waves. It will be readily apparent to those of ordinary skill in the art that at least a portion of the antenna wire in the embodiments depicted on FIGS. 3A through 3E is non-orthogonal with the longitudinal axis of the tool body.

Figure 4A:
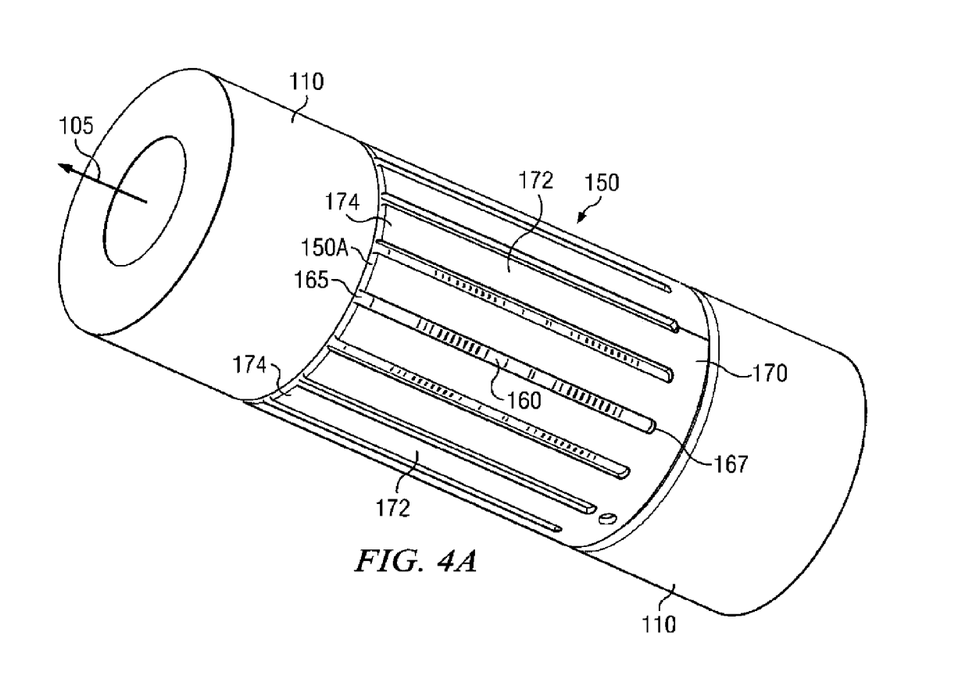
FIGS. 4A and 4B (FIG. 4) depict one exemplary embodiment of a measurement tool in accordance with the present invention in isometric (FIG. 4A) and exploded (FIG. 4B) views.
Figure 4B:
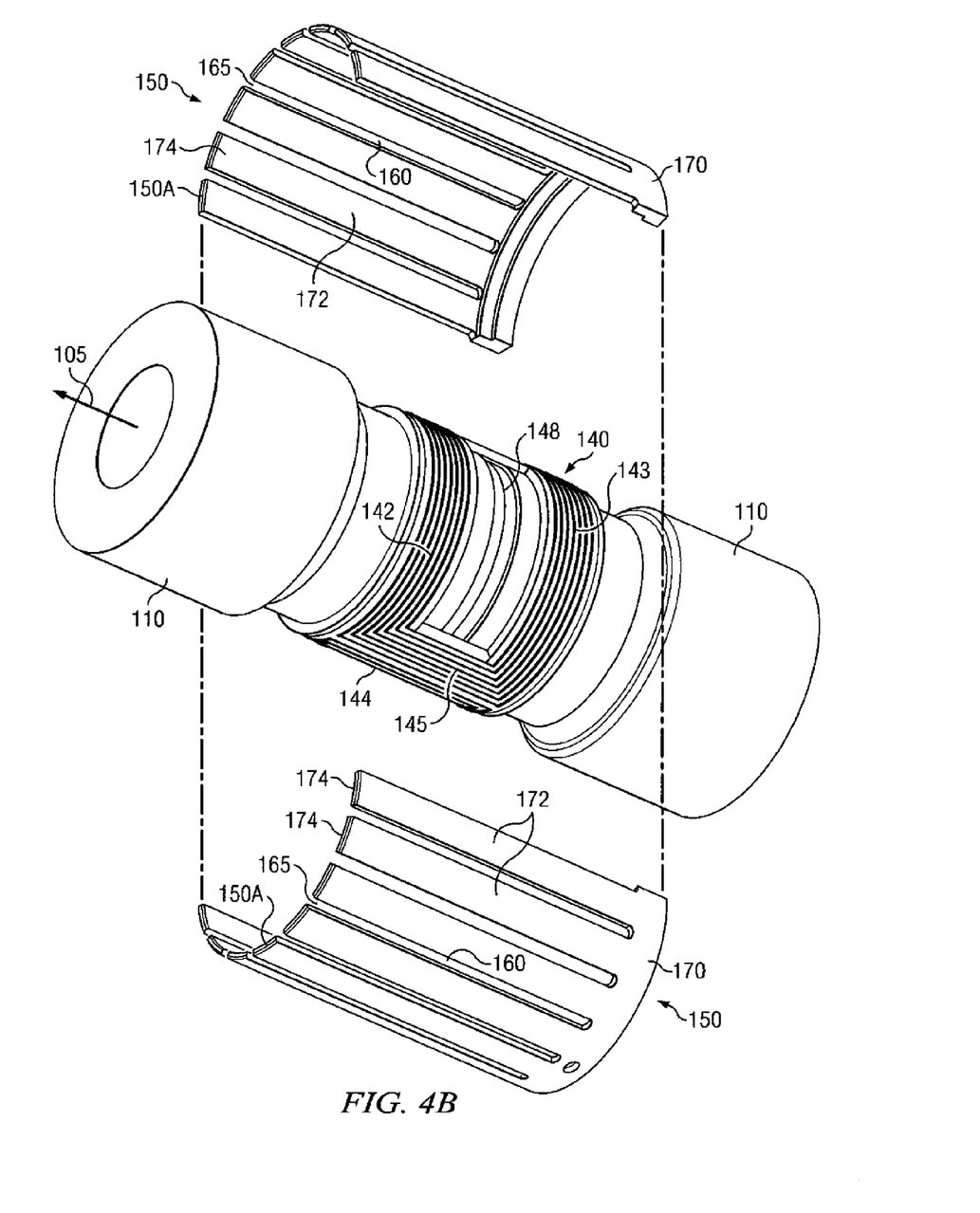

FIGS. 4A and 4B (referred to collectively as FIG. 4) depict one exemplary embodiment of an antenna shield 150 in accordance with the present invention. In FIG. 4A shield 150 is depicted as deployed about a directional resistivity antenna. Antenna shield 150 includes at least one slot 160 having at least one electrically open end 165 formed in the shield 150. By electrically open it is meant that the there is no electrically conductive path about the end 165 of the slot 160. In contrast to an electrically open end, an electrically closed end is one in which there is an electrically conductive path about the end of the slot. In the exemplary embodiment depicted on FIG. 4A, each of the slots 160 have one open end 165 and one closed end 167. As depicted, the slots 160 begin at an axial end 150A of the shield 150. Since the slots 160 include at least one open end 165 (and since the slot 160 itself is substantially electrically insulative), the shield 150 cannot support electrical eddy currents circulating around the slot 160.

In the exemplary embodiment depicted on FIGS. 4A and 4B, antenna shield 150 includes a plurality of circumferentially spaced axial slots 160, each of which has one electrically open axial end 165. By axial, it is meant that the length of the slot 160 is substantially parallel with a longitudinal axis 105 of the tool. While axial slots are typically preferred for ease of manufacturing, the invention is expressly not limited in this regard. The slots may be oriented at substantially any angle with respect to the axis 105 provided that they include at least one electrically open end. While the exemplary embodiment depicted includes 16 slots, the invention is in no way limited to any particular number of slots.

The exemplary antenna shield structure depicted on FIGS. 4A and 4B may also be thought of as including a base portion 170 and a plurality of circumferentially spaced, fingers 172 extending axially away from the base portion 170. Again, the invention is not limited to axially extending fingers. The above described slots 160 are formed between adjacent fingers 172. The base portion 170 may be physically and electrically connected (i.e., grounded) with the tool body 110 while the ends 174 of the fingers 172 are electrically floating. By electrically floating it is meant that ends 174 are not electrically connected with one another or with the tool body 110. Ends 174 are only electrically connected to one another through the base 170. As stated above, the resultant structure is configured such that there is no electrically conductive loop about the slots 160.

In exemplary embodiments in which the base portion 170 of the shield 150 is both physically and electrically connected to the tool body 110, the shield may provide both static and physical shielding of the antenna. In alternative embodiments (which may be preferred with collocated multi-mode antennae), the shield may be physically connected and electrically isolated from the tool body (e.g., via the deployment of electrically insulating material internal to the shield). In such embodiments, the shield is intended to provide physical, but not static, shielding of the antenna. In such embodiments the shield tends to be essentially transparent to the multiple modes of electromagnetic radiation. Additional static shielding may be provided in such embodiments (e.g., via deploying a conventional static shield radially inward from shield 150).

In the exemplary embodiment depicted, antenna shield 150 is configured as a two-piece sleeve (FIG. 4B). Each semi-cylindrical piece may be fastened to the tool body using conventional means (e.g., via threaded screws), thereby establishing physical and optional electrical connection between the base portion 170 and tool body 110. The invention is not limited in these regards.

With further reference to FIG. 4B, exemplary tool embodiments in accordance with the present invention include at least one directional resistivity antenna (as described above with respect to FIG. 3). The exemplary embodiment depicted includes collocated x-mode and z-mode antennae. A saddle coil 140 having first and second circumferential portions 142 and 143 and first and second parallel axial portions 144 and 145 is configured as an x-mode antenna. It will be appreciated that the exemplary saddle coil embodiment depicted includes a plurality of grooves for deploying multiple turns of antenna wire. A conventional z-mode antenna coil 148 is deployed between the first and second circumferential portions of the x-mode antenna. As described above, the invention is not limited to saddle coil embodiments.

Figure 5A:
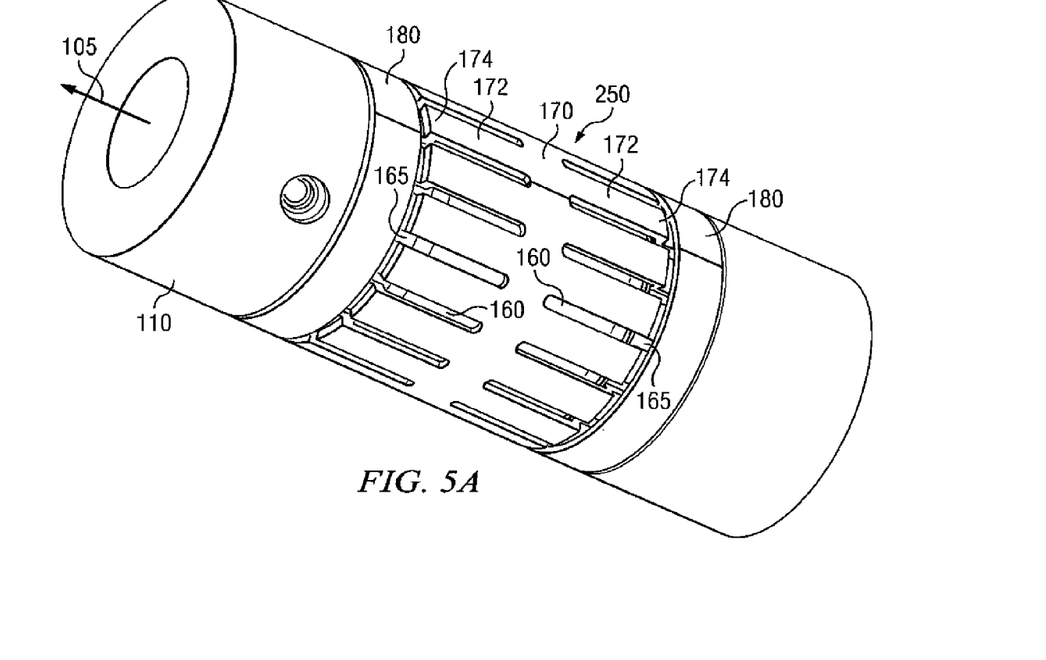
FIGS. 5A and 5B (FIG. 5) depict an alternative embodiment of a measurement tool in accordance with the present invention in isometric (FIG. 5A) and longitudinal cross-sectional (FIG. 5B) views.
Figure 5B:
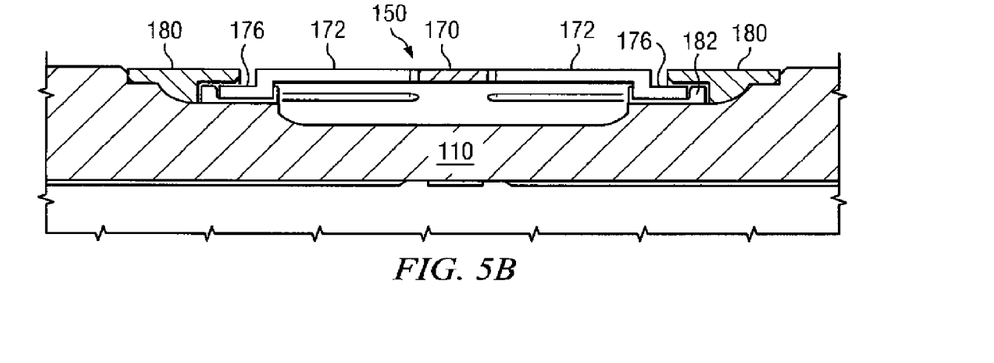

FIGS. 5A and 5B depict an alternative antenna shield 250 embodiment in accordance with the present invention. Antenna shield 250 is similar to antenna shield 150 in that it includes at least one slot 160 formed therein having at least one electrically open end 165. The antenna shield 250 may also be thought of as including a plurality of spaced apart metallic fingers. Antenna shield 250 differs from shield 150 in that it includes a plurality of fingers 172 extending in opposing directions from base portion 170. The finger ends 174 are electrically floating as described above with respect to FIG. 4.

In the exemplary embodiment depicted, shield 250 is electrically isolated from the tool body 110, although the invention is not limited in this regard. As depicted on FIG. 5B, radially inset finger ends 176 are secured in place between rings 180 and the tool body 110. Spacers 182 are deployed so as to prevent electrical connection between the finger ends 176 and rings 180. Rings 180 may be physically connected to the tool body using substantially any known means, e.g., via welding or screwing.

Figure 6:
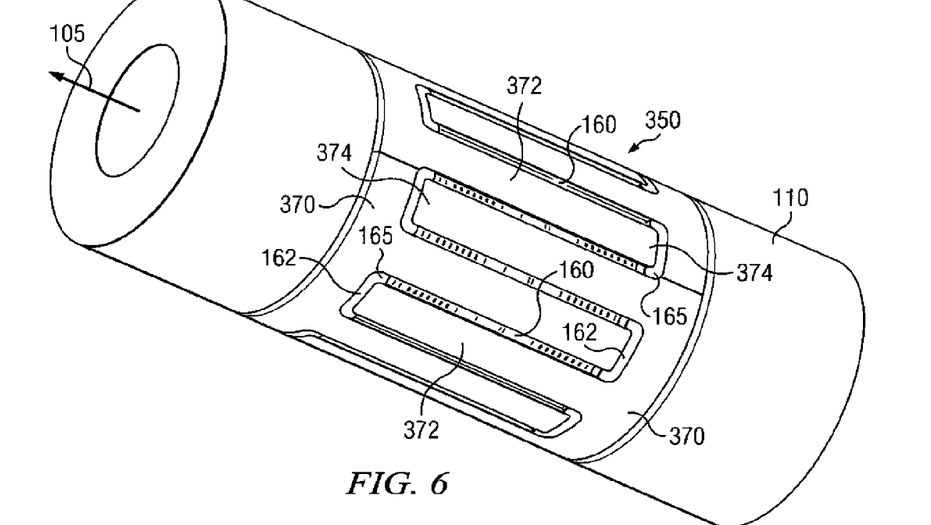
FIG. 6 depicts another alternative embodiment of a measurement tool in accordance with the present invention.

FIG. 6 depicts another alternative antenna shield 350 embodiment in accordance with the present invention. Antenna shield 350 is similar to antenna shield 150 in that it includes a plurality of slots 160 having at least one electrically open end 165. In the exemplary embodiment depicted, the slots 160 are connected to one another via corresponding circumferential slot portions 162 formed at alternating axial ends 165 of the slot 160. The slots 160 may therefore be thought of as including first and second electrically open ends 165. Antenna shield 350 may also be thought of as having a single rectangular zigzag slot formed in the sleeve. In the exemplary embodiment depicted, the rectangular zigzag slot includes a plurality of axial slot portions 160 and circumferential connecting slot portions 162, although the invention is not limited in this regard.

Antenna shield 350 may further be thought of as including a plurality of spaced apart fingers 372. Each of the fingers is electrically connected with one of two axially opposed base portions 370. These base portions may further be connected (i.e., grounded) with the tool body 110 as described above, however, the invention is not limited in this regard. As described above with respect to FIG. 4, each of the fingers 372 includes an electrically floating end 374. In the exemplary embodiment depicted on FIG. 6, circumferentially adjacent fingers are electrically connected to the opposing base portions on opposing axial ends of the shield.

Figure 7:
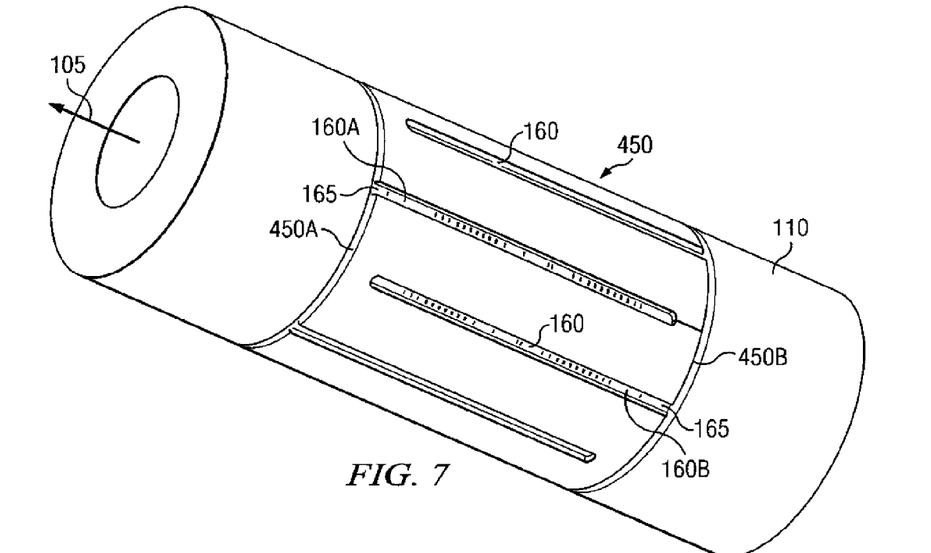
FIG. 7 depicts yet another alternative embodiment of a measurement tool in accordance with the present invention.

FIG. 7 depicts yet another alternative antenna shield 450 embodiment in accordance with the present invention. Antenna shield 450 is similar to antenna shields 150 and 250 in that it includes a plurality of spaced apart slots 160 having at least one electrically open end 165. Each of the slots 160 begins at an axial end of the shield 450. Antenna shield 450 differs from antenna shields 150 and 250 in that adjacent ones of the slots 160 begin at opposing axial ends of the shield 450 (e.g., slot 160A begins at axial end 450A and the adjacent slot 160B begins at axial end 450B). The resultant shield structure may be thought of as having a rectangular zigzag configuration.

Figure 8A:
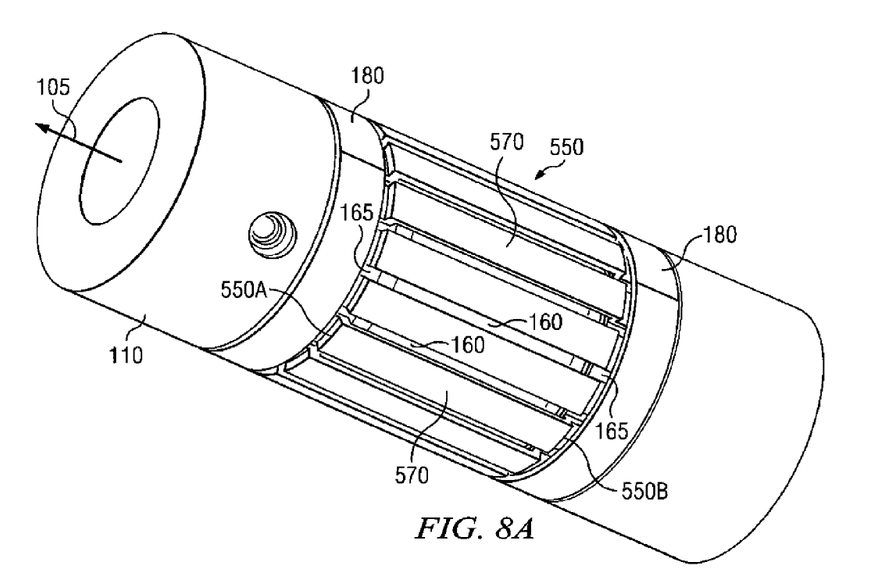
FIGS. 8A and 8B (FIG. 8) depict still another alternative embodiment of a measurement tool in accordance with the present invention.
Figure 8B:
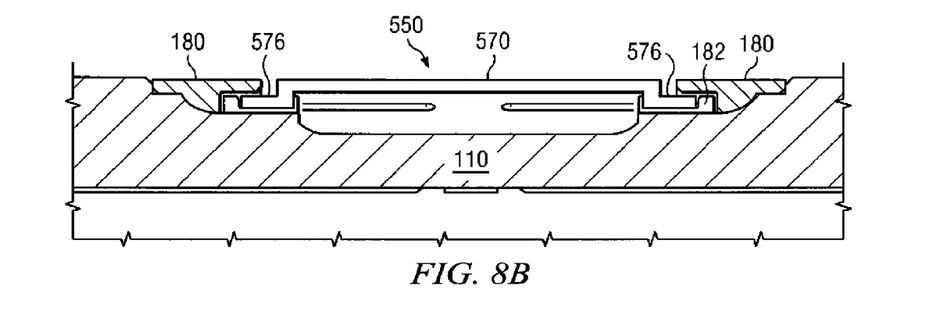

FIGS. 8A and 8B depict still another alternative antenna shield 550 embodiment in accordance with the present invention. Antenna shield 550 is similar to shield 250 in that it includes a plurality of spaced apart slots 160 having at least one electrically open end 165. In this exemplary embodiment, each of the slots 160 includes first and second electrically open ends 165. As depicted, each of the slots 160 begins at one axial end 550A of the shield 550 and extends to the opposing axial end 550B of the shield 550. Antenna shield 550 may also be thought of as including a plurality of spaced apart plates 570 (circumferentially spaced in the exemplary embodiment depicted). These plates 570 are electrically isolated from the tool body on at least one end 550A, 550B and are preferably electrically isolated from one another and from the tool body 110 on both axial ends 550A, 550B.

As depicted on FIG. 8B, each of the plates 570 may include radially inset ends 576 which may be secured in place between rings 180 and the tool body 110. Electrically insulative spacers 182 are deployed on at least one end 550A, 550B of the shield (and preferably both ends as depicted) so as to prevent electrical connection between the plates 570 and the rings 180. Rings 180 may be physically connected to the tool body using substantially any known means, e.g., via welding or screwing.

While not depicted in FIGS. 4 through 8, it will be appreciated that the antenna shields may be advantageously encapsulated in a substantially electrically insulative material such as PEEK (a polyaryletheretherketone) so as to provide the antenna with additional shielding and drilling fluid isolation. By substantially electrically insulative it is meant that the electrical conductivity of the encapsulating material is negligible as compared to the electrical conductivity of the shield. Such insulation tends to further electrically isolate the finger end portions from one another and from the tool body.

In the exemplary embodiments depicted on FIGS. 4 through 8, slots 160 are depicted as being substantially parallel with the longitudinal axis 105 of the tools. While such axial configurations are typically preferred (e.g., in light of manufacturing considerations), the invention is expressly not limited in this regard. The slots 160 may likewise be angled with respect to the longitudinal axis. Moreover, the slots are depicted as having a uniform width. The invention is also not limited in this regard as the width of the fingers on FIGS. 4 through 7 and the plates on FIG. 8 may vary along the length of the finger/plate. For example, shields in accordance with the invention may include fingers/plates that are wider on one end than on the other. The invention is not limited in any of these regards.

The present invention is now described in further detail with respect to the following example, which is intended to be purely exemplary and therefore should not be construed in any way as limiting its scope. A laboratory scale LWD directional resistivity tool including an x-mode transmitting antenna was rotatably deployed in an 8 inch diameter test cylinder. The test cylinder was filled with 0.156 ohm·m salt water. The x-mode transmitting antenna included a serpentine antenna, for example, as described above with respect to FIG. 3C. A receiver was positioned outside the test cylinder at a radial distance of 30 inches from the transmitting antenna.

The x-mode transmission was measured for four LWD shield configurations. These configurations were as follows: (a) a first control configuration in which the x-mode transmitter had no antenna shield, (b) a second control configuration in which the x-mode antenna had a prior art antenna shield including conventional closed ended axial slots, (c) a first test configuration in which the x-mode antenna had a shield in accordance with the present invention as depicted on FIGS. 8A and 8B, and (d) a second test configuration in which the x-mode antenna had a shield in accordance with the present invention as depicted on FIGS. 4A and 4B. The prior art antenna was configured such that the axial slots were closed-ended, i.e., that such that there was no electrically conductive loop in the shield about any of the slots. The laboratory scale LWD tool was rotated through a full turn. The x-mode transmitter was fired and the corresponding signal received at 15 degree intervals.

Figure 9:
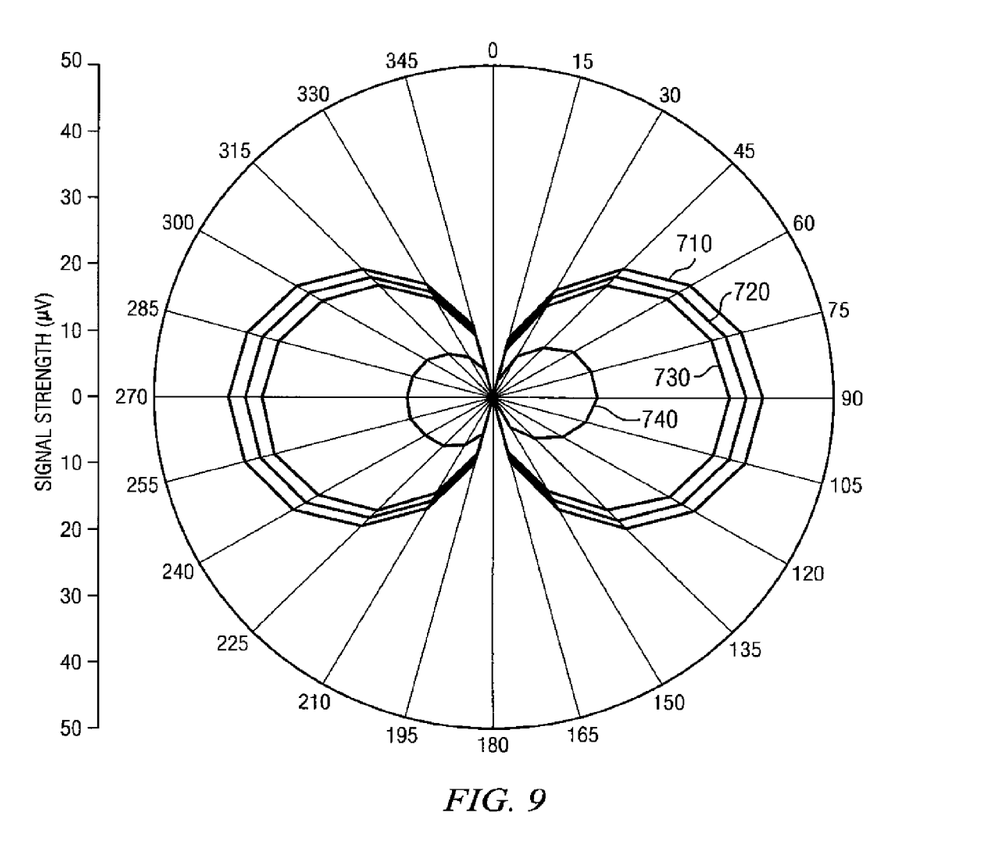
FIG. 9 depicts test data acquired for first and second exemplary antenna embodiments in accordance with the present invention.

The results of this test are depicted on FIG. 9. Both inventive shields were demonstrated to have significantly improved signal transmission (reduced attenuation) as compared with the prior art antenna shield. In particular, the transmission efficiency of the first inventive shield (depicted at 720) was observed to be about 95 percent as compared with the first control (depicted at 710) in which no shield was utilized (max received energy ratio of 37/39). The transmission efficiency of the second inventive shield (depicted at 730) was observed to be about 90 percent as compared with the first control (max received energy ratio of 35/39). In contrast to the inventive antennae, the prior art antenna shield (the second control) was observed to be highly attenuating (as depicted at 740) to x-mode electromagnetic waves, having a transmission efficiency of about 36 percent as compared with the first control (max received energy ratio of 14/39). Those of ordinary skill in the art will readily appreciate that the first and second inventive antenna shields are essentially transparent to x-mode electromagnetic waves.

Although the present invention and its advantages have been described in detail, it should be understood that various changes, substitutions and alternations can be made herein without departing from the spirit and scope of the invention as defined by the appended claims.

We claim:

1. A logging while drilling directional resistivity tool comprising:
   a logging while drilling tool body having a longitudinal axis;
   a directional resistivity antenna deployed on the tool body, the directional resistivity antenna configured to transmit and/or receive electromagnetic waves having a dipole moment transverse to the longitudinal axis of the tool body; and
   a metallic antenna shield deployed on the tool body about the directional resistivity antenna, the shield physically protecting the antenna from mechanical impacts in a borehole environment, the shield having a base portion and a plurality of spaced apart fingers, each of the fingers including a finger end that is electrically isolated from the tool body and from each of the other finger ends, the fingers being substantially parallel with the longitudinal axis of the tool body and orthogonal with the dipole moment of the directional resistivity antenna.

2. The logging while drilling tool of claim 1, wherein the directional resistivity antenna comprises a transverse antenna, a saddle coil antenna, a bi-planar antenna, or a serpentine antenna.

3. The logging while drilling tool of claim 1, wherein the directional resistivity antenna includes an antenna wire, at least a portion of the antenna wire being substantially parallel with the longitudinal axis of the tool body.

4. The logging while drilling tool of claim 1, wherein the directional resistivity antenna comprises collocated x-mode and z-mode antennae, the x-mode antenna having the dipole moment transverse to the longitudinal axis.

5. The logging while drilling tool of claim 1, further comprising a plurality of spaced apart slots formed in the antenna shield, the slots including at least one electrically open end.

6. The logging while drilling tool of claim 5, wherein the slots are substantially parallel with the longitudinal axis of the tool body.

7. The logging while drilling tool of claim 5, wherein the spaced apart slots are connected to one another via corresponding circumferential slot portions formed at alternating ends of the slots.

8. The logging while drilling tool of claim 1, comprising a single rectangular zigzag slot formed in the antenna shield, the zigzag slot defining the plurality of spaced apart fingers, the fingers being substantially parallel with the longitudinal axis and orthogonal with the dipole moment.

9. The logging while drilling tool of claim 1, wherein a first plurality of the fingers extends away from the base portion in a first direction and a second plurality of the fingers extends away from the base portion in an opposing second direction.

10. The logging while drilling tool of claim 1, wherein the antenna shield is encapsulated in an electrically insulating material.

11. A logging while drilling directional resistivity tool comprising:
- a logging while drilling tool body having a longitudinal axis;
- a directional resistivity antenna deployed on the tool body, the directional resistivity antenna configured to transmit and/or receive electromagnetic waves having a dipole moment transverse to the longitudinal axis of the tool body; and
- a metallic antenna shield deployed on the tool body about the directional resistivity antenna, the antenna shield physically protecting the antenna from mechanical impacts in a borehole environment, the antenna shield including a plurality of slots having at least one electrically open end such that there is no electrically conductive loop about the slots, the slots being substantially parallel with the longitudinal axis of the tool body and orthogonal with the dipole moment of the directional resistivity antenna.

12. The logging while drilling tool of claim 11, wherein the plurality of slots are connected to one another via corresponding circumferential slot portions formed at alternating ends of the slots.

13. The logging while drilling tool of claim 11, wherein the slots define a plurality of spaced apart fingers extending away from a base portion such that each of the fingers includes a finger end that is electrically isolated from the tool body and from each of the other finger ends.

14. The logging while drilling tool of claim 11, wherein adjacent ones of the slots begin at opposing axial ends of the shield.

15. The logging while drilling tool of claim 11, wherein each of the slots includes first and second electrically open ends.

16. The logging while drilling tool of claim 15, wherein the slots define a plurality of spaced apart plates, each of the plates being electrically isolated from one another and from the tool body.

17. The logging while drilling tool of claim 11, wherein the directional resistivity antenna includes an antenna wire, at least a portion of the antenna wire being substantially parallel with the longitudinal axis of the tool body.

18. The logging while drilling tool of claim 11, wherein the directional resistivity antenna comprises collocated x-mode and z-mode antennae, the x-mode antenna having the dipole moment transverse to the longitudinal axis.

19. A logging while drilling directional resistivity tool comprising:
- a logging while drilling tool body having a longitudinal axis;
- first and second collocated resistivity antennae deployed on the tool body, the first antenna configured to transmit and/or receive axial electromagnetic waves and the second antenna configured to transmit and/or receive an electromagnetic wave having a substantially pure transverse mode with a dipole moment transverse to the longitudinal axis of the tool body; and
- a metallic antenna shield deployed on the tool body about the collocated resistivity antennae, the antenna shield being configured to physically protect the antennae from mechanical impacts, the antenna shield having a base portion and a plurality of spaced apart fingers, each of the fingers being parallel with the longitudinal axis of the tool body, each of the fingers further including a finger end that is electrically isolated from the tool body and from each of the other finger ends.

20. The logging while tool of claim 19, wherein the antenna shield further comprises a plurality of axial slots formed therein, each of the slots including at least one electrically open end and being parallel with the longitudinal axis of the tool body.

21. The logging while drilling tool of claim 19, wherein a first plurality of fingers extends away from the base portion in a first axial direction and a second plurality of fingers extends away from the base portion in an opposing second axial direction.

22. The logging while drilling tool of claim 19, wherein the second antenna comprises a saddle coil.

23. A logging while drilling directional resistivity tool comprising:
- a logging while drilling tool body having a longitudinal axis;
- first and second collocated resistivity antennae deployed on the tool body, the first antenna configured to transmit and/or receive axial electromagnetic waves and the second antenna configured to transmit and/or receive an electromagnetic wave having a substantially pure transverse mode with a dipole moment transverse to the longitudinal axis of the tool body; and
- a metallic antenna shield deployed on the tool body about the collocated resistivity antennae, the antenna shield being configured to physically protect the antennae from mechanical impacts, the antenna shield including a plurality of spaced apart plates, each of the plates being substantially parallel with the longitudinal axis of the tool body, each of the plates further being electrically isolated from the tool body and from each of the other plates.

24. The logging while drilling tool of claim 23, wherein the antenna shield further comprises a plurality of slots located between the plates, each of the slots including first and second electrically open ends and being substantially parallel with the longitudinal axis of the tool body.

25. The logging while drilling tool of claim 23, wherein the second antenna comprises a saddle coil.

* * * * *